(12) United States Patent
Giometti et al.

(10) Patent No.: US 7,731,016 B2
(45) Date of Patent: Jun. 8, 2010

(54) OUTFEED MECHANISM FOR STARWHEEL TYPE GLASS INSPECTION MACHINE

(75) Inventors: Stephen M. Giometti, Horseheads, NY (US); Henry F. Raupp, Freeville, NY (US)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 12/367,974

(22) Filed: Feb. 9, 2009

(65) Prior Publication Data
US 2009/0139841 A1 Jun. 4, 2009

Related U.S. Application Data

(63) Continuation of application No. 11/973,732, filed on Oct. 9, 2007, now Pat. No. 7,494,003, which is a continuation of application No. 11/237,459, filed on Sep. 27, 2005, now abandoned.

(51) Int. Cl.
*B65G 15/12* (2006.01)
(52) U.S. Cl. .................. 198/626.1; 198/482.1
(58) Field of Classification Search ................. 198/452, 198/453, 454, 482.1, 626.1
See application file for complete search history.

(56) References Cited

U.S. PATENT DOCUMENTS

| 4,230,219 | A | | 10/1980 | Pezzin et al. |
| 4,526,270 | A | | 7/1985 | Dichter |
| 4,909,377 | A | | 3/1990 | Bernhard |
| 4,934,510 | A | | 6/1990 | Lutgendorf |
| 5,261,207 | A | | 11/1993 | Bedin |
| 5,624,021 | A | * | 4/1997 | Novak et al. ............. 198/626.1 |
| 5,632,370 | A | * | 5/1997 | Grathoff ..................... 198/587 |
| 6,109,426 | A | * | 8/2000 | Messer, III .................. 198/817 |
| 6,460,686 | B1 | | 10/2002 | Giometti et al. |
| 6,505,728 | B1 | | 1/2003 | Dion |
| 6,745,890 | B2 | | 6/2004 | Nickey et al. |
| 6,806,060 | B2 | | 10/2004 | Giometti |
| 6,848,564 | B2 | | 2/2005 | Nickey et al. |
| 7,101,506 | B1 | * | 9/2006 | Taylor et al. ................ 264/543 |
| 7,261,197 | B2 | | 8/2007 | Nickey et al. |
| 2008/0142339 | A1 | * | 6/2008 | Charpentier |

FOREIGN PATENT DOCUMENTS

| FR | 2397345 | 7/1978 |
| GB | 2199297 | 7/1988 |

\* cited by examiner

*Primary Examiner*—Douglas A Hess
(74) *Attorney, Agent, or Firm*—Reinhart Boerner Van Deuren s.c.

(57) ABSTRACT

A bottle inspection machine is disclosed which has a starwheel feeder and an outfeed mechanism for receiving bottles from the starwheel feeder. The outfeed mechanism has an inner belt conveyor which has a pickoff wheel adjacent the starwheel feeder and a second wheel. At least one drive belt is supported by the pickoff and second wheels for defining a linear outfeed belt portion. The outfeed mechanism also has an outer serpentine belt conveyor which has an idler wheel located radially inwardly from the pick off wheel which defines an opening for receiving a bottle displaced by the starwheel feeder and a third wheel. At least one flexible serpentine belt is supported by the idler and third wheels which are located to define a location where a bottle will be discharged from the outfeed mechanism. The serpentine belt is sufficiently flexible so that a bottle displaced into the opening between the pickoff and idler wheels will be conveyed by the serpentine and inner belts with the serpentine belt changing its configuration as the bottle is conveyed to the discharge location.

13 Claims, 2 Drawing Sheets

OUTFEED MECHANISM FOR STARWHEEL TYPE GLASS INSPECTION MACHINE

CROSS-REFERENCE TO RELATED APPLICATIONS

This application is a continuation of U.S. patent application Ser. No. 11/973,732, filed on Oct. 9, 2007, now U.S. Pat. No. 7,494,003, issued on Feb. 24, 2009, which is entitled "Outfeed Mechanism for Starwheel Type Glass Inspection Machine," which in turn is a continuation of U.S. patent Ser. No. 11/237,459, filed on Sep. 27, 2005, which is entitled "Outfeed Mechanism for Starwheel Type Glass Inspection Machine," now abandoned, both of which patent applications are assigned to the assignee of the present invention, and both of which patent applications are hereby incorporated herein by reference in their entirety.

BACKGROUND OF THE INVENTION

Field of the Invention

The present invention relates to outfeed mechanisms for bottle inspection machines.

U.S. Pat. No. 6,460,686 discloses a machine that inspects glass bottles. This machine is an indexing, starwheel type machine. Containers enter a starwheel by use of a timing feed screw. This feed screw releases containers in time with starwheel displacement such that each container enters an open pocket. The starwheel then indexes rotationally a fixed amount and stops or dwells. Various forms of inspection take place at each dwell position. The starwheel continues the index and dwell cycle. After the last dwell station, the container is removed from the starwheel with guides on opposing sides of the container. The outside guide is fixed and the inside guide is a moving guide (the end portion of a belt conveyor), which provides a motive force that drives the container out of the starwheel and into the transfer mechanism.

With this methodology, the container rolls along the fixed guide. It is driven by the moving guide. The forward velocity of this container along the fixed guide can be shown to be equal to one half the linear velocity of the moving guide. The transfer mechanism consists of the above discussed belt conveyor and a second conveyor operatively associated with a forward portion of the first belt conveyor. These belt conveyors travel at identical velocities. Once the container reaches the end of the fixed guide, it contacts the second belt conveyor which with the first belt conveyor, causes the container to double its velocity, to match the speed of the belt conveyors.

The first belt conveyor must be moving fast enough to prevent two adjacent containers from coming into contact. Once the containers reach the second belt conveyor, the spacing doubles due to the doubling of their forward velocity. The drawback to this method is that the containers are traveling at a high velocity as they exit the machine. This high velocity must be transferred to the downstream conveyors, as it is desirable to closely match conveyor speeds for container stability. If this speed could be reduced, it would improve downstream stability, thus reducing the falling over of containers and resulting stoppages.

OBJECTS OF THE INVENTION

It is accordingly an object of the present invention to provide an outfeed mechanism for a high-speed bottle inspection machine of the type described that will enhance the stability of round containers and improve the reliability of handling non-round containers.

Other objects and advantages of the present invention will become apparent from the following portion of this specification and from the accompanying drawings, which illustrate a presently preferred embodiment incorporating the principles of the invention.

BRIEF DESCRIPTION OF THE EXEMPLARY EMBODIMENT

Figure 1:
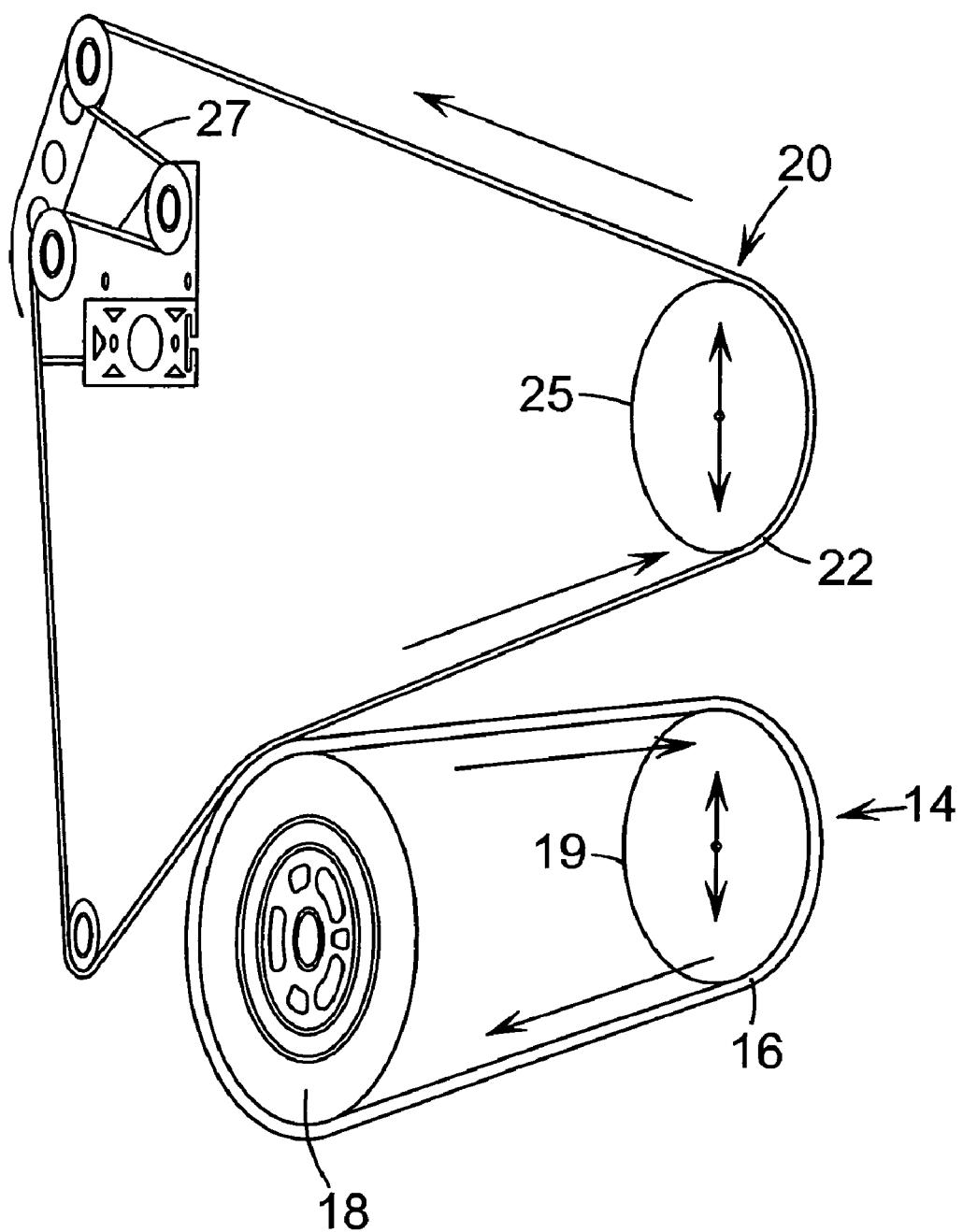
FIG. 1 is a top view of a bottle handler for use with an inspection machine.
Figure 2:
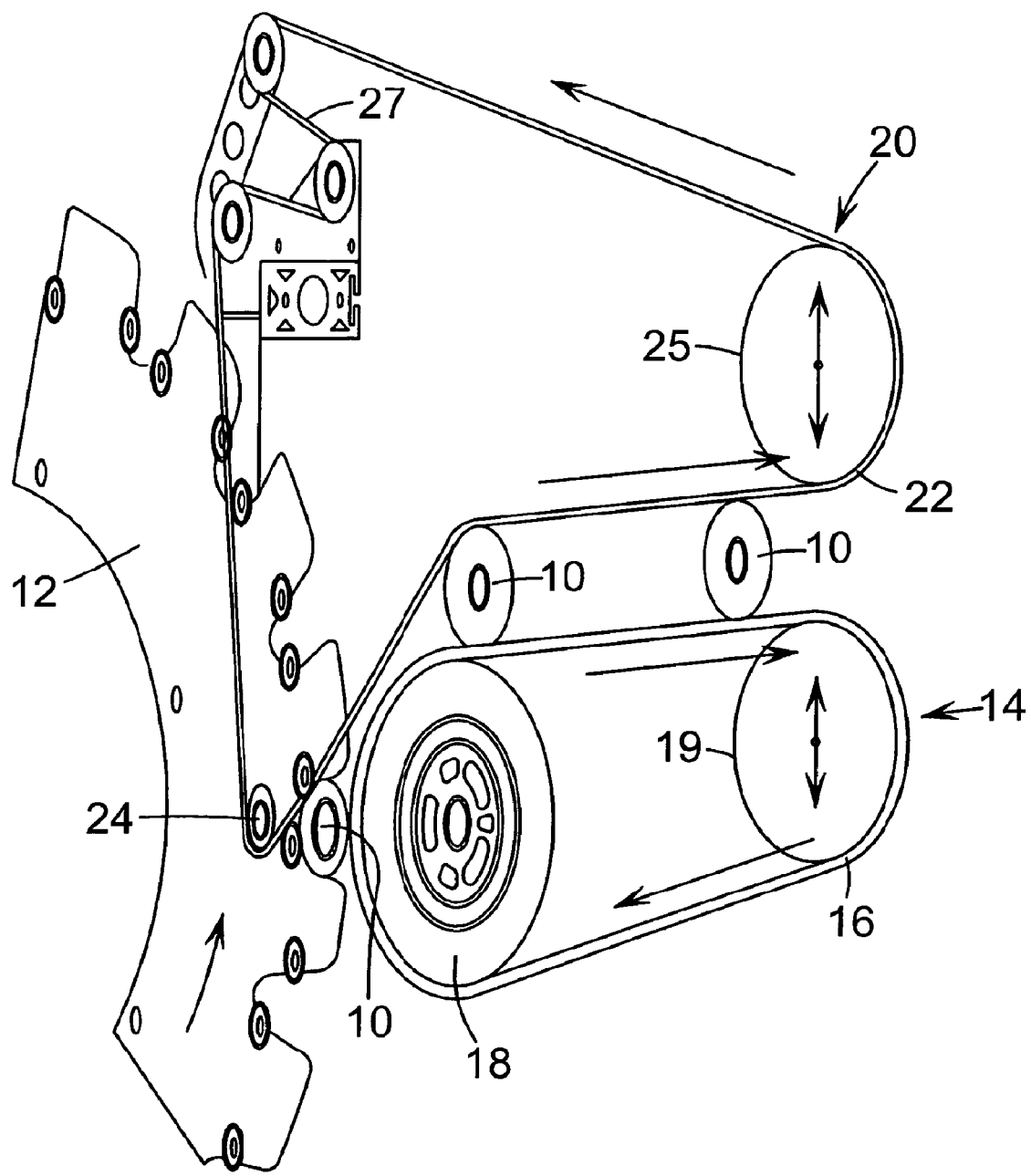
FIG. 2 is a top view of the bottle spacer shown in FIG. 1 operating with a conventional bottle inspection machine.

The inspection machine is an indexing, starwheel type machine. Containers 10 enter the starwheel 12 by use of a timing feed screw (not shown). This feed screw releases containers 10 in time with the starwheel 12 such that the leading container 10 enters an open pocket. The starwheel 12 then indexes rotationally a fixed amount and stops or dwells. Various forms of inspection take place at each dwell position. The starwheel 12 continues the index and dwell cycle. After the last dwell station, the container 10 is removed from the starwheel 12 with guides on opposing sides of the container 10. One guide, the inner guide 14, is a moving guide in the form of a belt conveyor which can have one or a plurality of vertically spaced belts 16. This belt conveyor is supported by a first or pickoff wheel 18 at one end and a second or drive wheel 19 at the other which is driven by an appropriate motor/drive (not shown).

The outer guide is a flexible serpentine belt conveyor 20 which can be single or multiple belts 22. As can be seen from the drawing, the serpentine belt conveyor is supported by a number of wheels including an idler wheel 24 and a third or serpentine belt drive wheel 25. The line connecting the axes of the pickoff wheel 18 and the idler wheel 24 is generally transverse to the path of movement of a container 10 passing therebetween. The outer serpentine belt conveyor has an appropriate motor/drive (not shown) and the serpentine belt is displaced at the same velocity as the inside conveyor belt. The serpentine and belt conveyors are mutually adjustable. The serpentine belt 22 must be sufficiently flexible so that the configuration (or line) of the serpentine belt 22 between the idler wheel 24 and the serpentine belt drive wheel 25 can change as a container 10 proceeds from a location between the pickoff wheel 18 and the idler wheel 24 clockwise around the pickoff wheel 18 to the location where the container 10 is discharged from the belts 16 and 22 (a take-up device 27 accommodates any variation in serpentine belt 22 length from the idler wheel 24 to the serpentine belt drive wheel 25). The serpentine belt drive wheel 25 and the inside belt drive wheel 19 are located relative to one another so that the belts 16 and 22 will release a container 10 simultaneously (the line between the axes of these wheels 19 and 25 is transverse to the path of the container 10).

The container 10 now travels at the same linear velocity as the belt conveyor throughout the entire outfeed. The minimum belt velocity to prevent container to container contact is cut in half. This also reduces the container velocity at the exit of the machine to one half the current methodology. This reduced speed substantially improves container handling. The other benefit of this manner of outfeed is that the relatively flexible serpentine belt 22 can accept non-round containers in many orientations and feed them out successfully.

The long serpentine belt 22 does not necessarily engage the other belt 16 when no container 10 is located therebetween, but it may, and probably does, works best when it does.

Case 1: The ware contact surface of the serpentine belt 22 may rest against the ware contact surface of the inner (short) belt 16.

Case 2: OR for relatively small ware (less than or equal to approximately 3.5 inches in diameter), one may place a pickoff wheel 18 on the front side pickoff wheel mount post for the ware contact surface of the serpentine belt 22 to rest against.

Case 3: OR for relatively large ware (greater than or equal to approximately 3.5 inches in diameter), the serpentine belt 22 may not be supported at all.

Case 1 is preferred when the ware geometry will allow it.

Case 2 is the next best choice (for optimal outfeed performance).

Case 3 is easier to set up than case 1 or 2 but may not perform as well.

Cases 1 and 2 will be the most common use of this system.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A container inspection machine, comprising:
    a starwheel feeder;
    an outfeed mechanism for receiving containers from the starwheel feeder including:
        an inner belt conveyor operable at a desired conveyor speed, having:
            a pickoff wheel adjacent the starwheel feeder;
            a second wheel; and
            at least one drive belt supported between said pickoff wheel and said second wheel for defining a linear outfeed belt portion;
        an outer serpentine belt conveyor operable at the same desired conveyor speed, having
            an idler wheel, said idler wheel with said pickoff wheel defining an opening for receiving a container displaced by said starwheel feeder;
            a third wheel; and
            at least one flexible serpentine belt supported between said idler wheel and said third wheel;
    said idler wheel and said third wheel being selectively located to define a serpentine belt path which, with said pickoff wheel, defines an interference for the displacement of a container into the opening and around said pickoff wheel; and
    said serpentine belt being sufficiently flexible so that a container displaced into the opening between said pickoff wheel and said idler wheel will be conveyed by said serpentine belt and said inner belt with said serpentine belt changing its configuration as the container is conveyed around said pickoff wheel.

2. A container inspection machine as defined in claim 1, wherein said third wheel and said second wheel define a discharge location for a container displaced by said inner belt conveyor and said outer serpentine belt conveyor.

3. A container inspection machine as defined in claim 2, wherein said inner and serpentine belts are located relative to one another so that they will simultaneously release a container at said discharge location.

4. A container inspection machine as defined in claim 1, wherein said inner and serpentine belts are located relative to one another so that they will simultaneously engage and pick up a container from said starwheel feeder.

5. A container inspection machine as defined in claim 1, wherein said linear outfeed belt portion leads to an exit location.

6. A container inspection machine as defined in claim 1, wherein said third wheel is located so that said serpentine belt will maintain a bottle against said linear outfeed belt portion as said bottle is conveyed to an exit location.

7. A container inspection machine as defined in claim 1, additionally comprising:
    a take-up device that accommodates any variation in the length of said serpentine belt between said idler wheel and said third wheel.

8. A container inspection machine as defined in claim 1, wherein said second wheel and said third wheel are respectively located such that a line between an axis of said second wheel and an axis of said third wheel is transverse to the path of a container at an exit location.

9. A container inspection machine as defined in claim 1, wherein said serpentine belt and said drive belt are respectively located such that a portion of said serpentine belt rests against a portion of said drive belt when a container is not located therebetween.

10. A container inspection machine as defined in claim 1, wherein said serpentine belt and said drive belt are respectively located such that a portion of said serpentine belt rests against a portion of said drive belt that is located on said pickoff wheel when a container is not located therebetween.

11. A container inspection machine as defined in claim 1, wherein said serpentine belt and said drive belt are respectively located such that said serpentine belt does not rest against said drive belt when a container is not located therebetween.

12. A container inspection machine capable of discharging inspected containers from a starwheel feeder, said container inspection machine comprising an outfeed mechanism for receiving containers from the starwheel feeder, said outfeed mechanism comprising:
    an inner belt conveyor operable at a desired conveyor speed, said inner belt conveyor comprising:
        a pickoff wheel located adjacent the starwheel feeder;
        a second wheel; and
        at least one drive belt supported between said pickoff wheel and said second wheel for defining a linear outfeed belt portion; and
    an outer serpentine belt conveyor operable at the same desired conveyor speed, said outer serpentine belt conveyor comprising:
        an idler wheel, said idler wheel with said pickoff wheel defining an opening for receiving a container displaced by said starwheel feeder;
        a third wheel; and at least one flexible serpentine belt supported between said idler wheel and said third wheel;

wherein said idler wheel and said third wheel are selectively located to define a serpentine belt path which, together with said pickoff wheel, defines an interference for the displacement of a container into the opening and around said pickoff wheel; and wherein said serpentine belt is sufficiently flexible so that a container displaced into the opening between said pickoff wheel and said idler wheel will be conveyed by said serpentine belt and said inner belt with said serpentine belt changing its configuration as the container is conveyed between said serpentine belt and said inner belt.

13. A method of operating a container inspection machine, comprising:

receiving containers from a starwheel feeder via an outfeed mechanism, said outfeed mechanism comprising an inner belt conveyor and an outer serpentine belt conveyer;

operating said inner belt conveyor at a desired conveyor speed, said inner belt conveyor comprising a pickoff wheel adjacent the starwheel feeder, a second wheel, and at least one drive belt supported between said pickoff wheel and said second wheel for defining a linear outfeed belt portion;

operating an outer serpentine belt conveyor at the same desired conveyor speed, said outer serpentine belt conveyor comprising an idler wheel, a third wheel, and at least one flexible serpentine belt supported between said idler wheel and said third wheel, said idler wheel with said pickoff wheel defining an opening for receiving a container displaced by said starwheel feeder;

respectively locating said idler wheel and said third wheel to define a serpentine belt path which, with said pickoff wheel, defines an interference for the displacement of a container into the opening and around said pickoff wheel; and making said serpentine belt sufficiently flexible so that a container displaced into the opening between said pickoff wheel and said idler wheel will be conveyed by said serpentine belt and said inner belt with said serpentine belt changing its configuration as the container is conveyed around said pickoff wheel.

* * * * *